United States Patent
Chang et al.

(10) Patent No.: US 7,885,528 B2
(45) Date of Patent: Feb. 8, 2011

(54) SYSTEM AND METHOD FOR FOCUSING A CHARGE COUPLED DEVICE LENS ON A SELECTED SURFACE OF AN OBJECT

(75) Inventors: Chih-Kuang Chang, Taipei Hsien (TW); Xian-Yi Chen, Shenzhen (CN); Li Jiang, Shenzhen (CN); Zhong-Kui Yuan, Shenzhen (CN); Xiao-Guang Xue, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/541,653

(22) Filed: Aug. 14, 2009

(65) Prior Publication Data

US 2010/0158496 A1 Jun. 24, 2010

(30) Foreign Application Priority Data

Dec. 23, 2008 (CN) .................... 2008 1 0306476

(51) Int. Cl.
*G03B 3/00* (2006.01)
*G02B 21/36* (2006.01)
*G02B 7/04* (2006.01)

(52) U.S. Cl. .................... 396/125; 396/432; 318/79; 250/201.3

(58) Field of Classification Search ............ 396/86, 396/116, 432; 348/79; 250/201.3
See application file for complete search history.

(56) References Cited

U.S. PATENT DOCUMENTS

| 6,449,087 B2 * | 9/2002 | Ogino ................... 359/383 |
| 7,253,385 B2 * | 8/2007 | Tanemura et al. ........ 250/201.3 |
| 7,345,814 B2 * | 3/2008 | Yoneyama et al. .......... 359/383 |

* cited by examiner

*Primary Examiner*—W. B. Perkey
*Assistant Examiner*—Dennis Hancock
(74) *Attorney, Agent, or Firm*—Raymond J. Chew

(57) ABSTRACT

A positioning system and method for focusing a charge coupled device (CCD) lens on a selected surface of an object to be measured is provided. The positioning system and method moves the CCD lens downwards to approximate an estimate Z-axis coordinate of the CCD lens, and moves the CCD lens upwards to find an accurate Z-axis coordinate of the CCD lens according to the selected surface of the object. The system and method further moves the CCD lens to a position corresponding to the accurate Z-axis coordinate to focus the CCD lens on the selected surface.

20 Claims, 9 Drawing Sheets

| 10 | 12 | 14 | 13 | 12 | 14 | 13 | 15 | 14 |
|---|---|---|---|---|---|---|---|---|
| D[0] | D[1] | D[2] | D[3] | D[4] | D[5] | D[6] | D[7] | D[8] |

FIG. 4a

| 10 | 12 | 13 | 13 | 13 | 13 | 14 | 14 | 14 |
|---|---|---|---|---|---|---|---|---|
| D[0] | D[1] | D[2] | D[3] | D[4] | D[5] | D[6] | D[7] | D[8] |

FIG. 4b

SYSTEM AND METHOD FOR FOCUSING A CHARGE COUPLED DEVICE LENS ON A SELECTED SURFACE OF AN OBJECT

BACKGROUND

1. Technical Field

Embodiments of the present disclosure relate to systems and methods for measuring objects, and particularly to a system and method for focusing a charge coupled device (CCD) lens on a selected surface of an object to be measured.

2. Description of Related Art

Measurement is an important phase in the manufacturing process and is closely interrelated to product quality. Generally, an engineer will use an image measuring machine to obtain an electronic image of an object. The image is stored in a computer and may be shown on a display device, where a program is used to determine precision of the object according to pixel data in the image.

A charge coupled device (CCD) lens of the image measuring machine may be connected to an image adapter card of the computer. The CCD lens, which has a focusing function within a fixed capture area, is used to capture images of the object. At present, the CCD lens of the image measuring machine can be moved up and down to focus on a surface of the object, so as to capture the image of the object. However, if an object is transparent, and has two surfaces (i.e., an upper surface and a lower surface), it is difficult to focus on one of the two surface of the object accurately by moving the CCD lens because the CCD lens cannot determine a surface is the upper surface or the lower surface.

BRIEF DESCRIPTION OF THE DRAWINGS

FIG. 4a and FIG. 4b are schematic diagrams of one embodiment of averaging the definitions of the captured images;

DETAILED DESCRIPTION

All of the processes described below may be embodied in, and fully automated via, functional code modules executed by one or more general purpose computers or processors. The code modules may be stored in any type of readable medium or other storage device. Some or all of the methods may alternatively be embodied in specialized hardware. Depending on the embodiment, the readable medium may be a hard disk drive, a compact disc, a digital video disc, or a tape drive.

Figure 1:
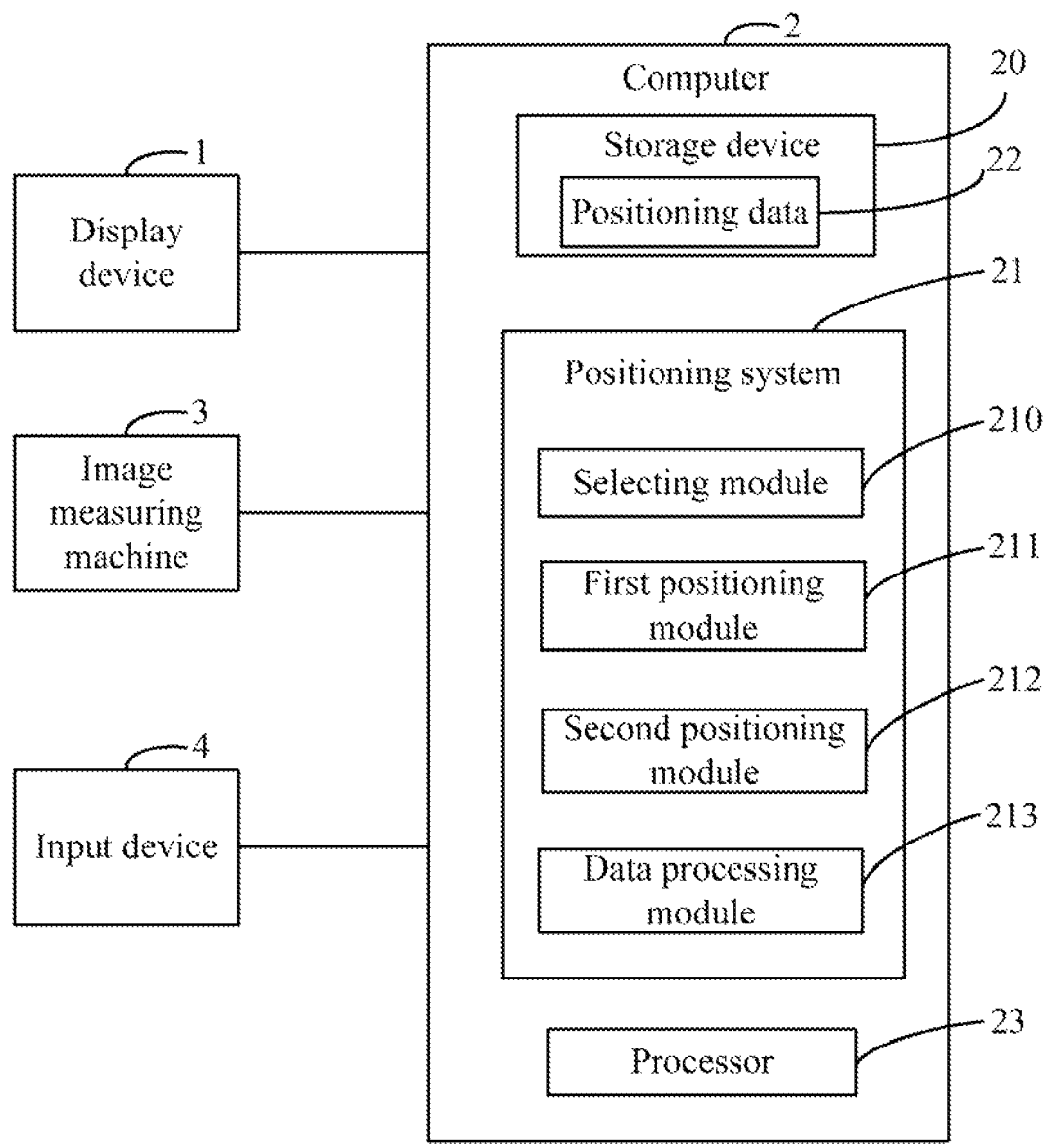
FIG. 1 is a block diagram of one embodiment of a computer comprising a system for focusing a CCD lens on a selected surface of an object to be measured.

FIG. 1 is a block diagram of one embodiment of a computer 2 comprising a positioning system 21. The positioning system 21 may be used to focus a charge coupled device (CCD) lens on a selected surface of an object to be measured. The positioning system 21 may be used to move the CCD lens downwards to approximate an estimate Z-axis coordinate of the CCD lens, then move the CCD lens upwards to find an accurate Z-axis coordinate of the CCD lens according to a selected surface of the object, and move the CCD lens to a position corresponding to the accurate Z-axis coordinate to focus the CCD lens on the selected surface. In one embodiment, the selected surface includes an upper surface or a lower surface of the object. A detailed description will be given in the following paragraphs.

In one embodiment, the computer 2 is electronically connected to a display device 1, an image measuring machine 3, and an input device 4. Depending on the embodiment, the display device 1 may be a liquid crystal display (LCD) or a cathode ray tube (CRT) display, for example. A schematic diagram of one embodiment of the image measuring machine 3 is shown in FIG. 2.

In one embodiment, the image measuring machine 3 includes a top cover 31, a CCD lens 32, a platform 33, and a holder 34. An object 35 (e.g., a chipset on a motherboard) to be measured is positioned on the platform 33. It may be understood that the embodiment of the image measuring machine 3 as illustrated in FIG. 2 is exemplary and may include other components that will be explained further herein, such as an X-axis motor along the X-axis, a Y-axis motor along the Y-axis, and an Z-axis motor along the Z-axis.

The computer 2 further includes a storage device 20 for storing information, such as positioning data 22. In one embodiment, the positioning data 22 include a definition of each captured image, Z-axis coordinates of the CCD lens 32 used to capture the images.

Figure 2:
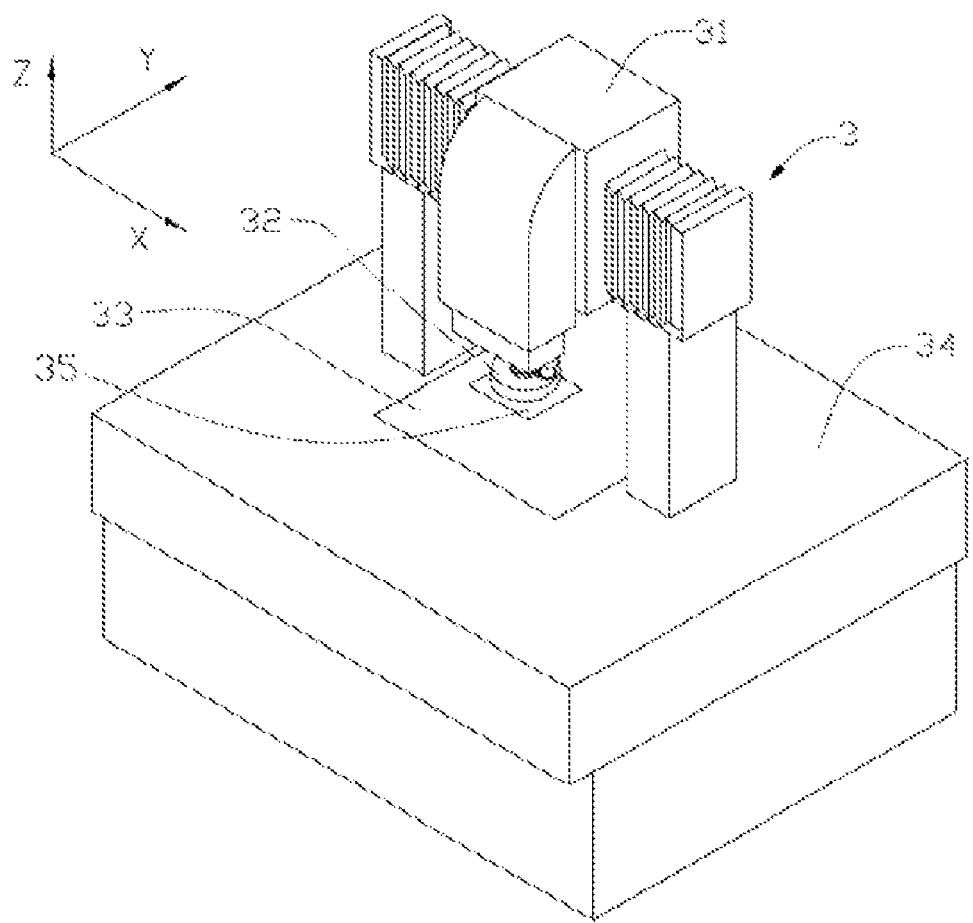
FIG. 2 is a schematic diagram of one embodiment of an image measuring machine.

The input device 4 is provided for manually moving one or more parts (e.g., the CCD lens 32) of the image measuring machine 3, e.g., along the X-axis, the Y-axis, and/or the Z-axis (refer to X-Y-Z coordinates shown in FIG. 2). In one embodiment, the input device 4 may be a lever for adjusting positions of the CCD lens 32 of the image measuring machine 3 manually.

In one embodiment, the positioning system 21 includes a selecting module 210, a first positioning module 211, a second positioning module 212, and a data processing module 213. In one embodiment, the modules 210-213 comprise one or more computerized instructions that are stored in the storage device 20. A processor 23 of the computer 2 executes the computerized instructions to implement one or more operations of the computer 2.

Figure 3:
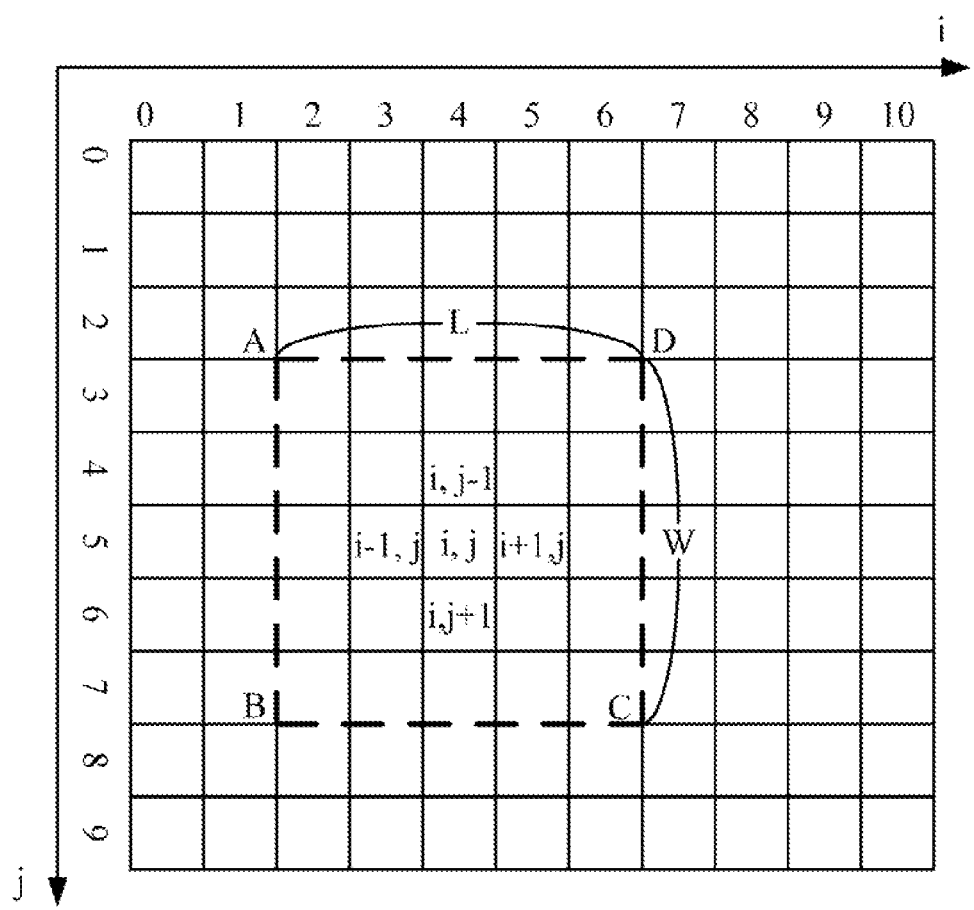
FIG. 3 is a schematic diagram of one embodiment of calculating a definition of a captured image.

The selecting module 210 receives a selected surface of the object 35 for the CCD lens 32 to focus on to take an image, and receives a focus point, and a focus range (L×W) of the selected surface that is designated by a user in the image. In one embodiment, a center of the focus range is the focus point, and a size of the focus range is determined according to the focus point, a length of the focus range ("L"), and a width of the focus range ("W"). As shown in FIG. 3, a pixel data (i,j) is selected as the focus point in the image of the object 35, the length of the focus range is /AD/(L=/AD/), and the width of the focus range is /CD/(W=/CD/), thus, the focus range is determined as a rectangle ABCD.

The first positioning module 211 aligns a center of the CCD lens 32 at a position of the focus point, and moves the CCD lens 32 downwards by a first preset distance (e.g., 20 millimeters) from a current Z-axis coordinate to approximate an estimate Z-axis coordinate of the CCD lens 32. A detailed description of aligning the center of the CCD lens 32 at the position of the focus point includes: aligning an X-axis coordinate of the center of the CCD lens 32 at an X-axis coordinate of the focus point, and aligning a Y-axis coordinate of the center of the CCD lens 32 at a Y-axis coordinate of the focus point.

A detailed description of moving the CCD lens 32 downwards by the first preset distance from the current Z-axis coordinate to approximate the estimate Z-axis coordinate of the CCD lens 32 is as follows. Firstly, the module 211 captures a sequence of images of the object 35 while the CCD lens 32 moves downwards, records Z-axis coordinates of the CCD lens 32 while capturing each of the sequence of images. Secondly, the module 211 calculates a definition of the focus range (L×W) of the selected surface in each captured image to obtain a definition of each captured image, selects a captured image having a highest definition. Thirdly, the module 211 identifies a Z-axis coordinate of the CCD lens 32 that captured the highest definition, and regards the obtained Z-axis coordinate as the estimate Z-axis coordinate of the CCD lens 32.

FIG. 3 is a schematic diagram of one embodiment of calculating a definition of a captured image. As shown in FIG. 3, P(i,j) represents a pixel data, D(i,j) represents a definition of the pixel data P(i,j), a formula for calculating a value of D(i,j) is as follows:

$$D(i,j)=Abs(Gray(i+1,j)-Gray(i-1,j))+Abs(Gray(i,j+1)-Gray(i,j-1))$$

In the above formula, "Gray(i,j)" represents a gray value of the pixel data P(i,j) in the captured image, "Abs( )" represents a function for calculating an absolute value. The first positioning module 211 sums each definition D(i,j) of each pixel data P(i,j) in the focus range "ABCD" to obtain a total definition of the focus range, divides the total definition by a number of the pixel data in the focus range to obtain an average definition of the focus range, and regards the average definition of the focus range as the definition of the captured image.

The second positioning module 212 moves the CCD lens 32 upwards by a second preset distance (e.g., 10 millimeters) from the estimate Z-axis coordinate, captures a sequence of images of the object 35 while the CCD lens 32 moves upwards, and records Z-axis coordinates of the CCD lens 32 while capturing each of the sequence of images. In one embodiment, the second preset distance is less than the first preset distance.

The second positioning module 212 further calculates a definition of each captured image based on the focus point and the focus range. A detailed description of calculating the definition of the captured image can refer to description in paragraph [0023]. In one embodiment, the definition of each captured image is stored in an array D, and the Z-axis coordinates of the CCD lens 32 are stored in an array Z, and an array index of a definition of a captured image in the array D is the same as an array index of a Z-axis coordinate of the CCD lens 32 in the array Z when the image is captured. For example, supposing a definition of a third captured image is stored in D[2] (i.e., the index in the array D is 2), thus, a Z-axis coordinate of the CCD lens 32 is stored in Z[2] when the third image is captured (i.e., the index in the array Z is 2). In one embodiment, if a total count of the definitions of the captured images in the array D or a total count of the Z-axis coordinates of the CCD lens 32 in the array Z is less than a preset integer (e.g., seven), the second positioning module outputs a failure information on the display device 1. In one embodiment, the failure information includes that the captured images are not enough.

The data processing module 213 averages the definitions of the captured images stored in the array D and the Z-axis coordinates of the CCD lens 32 stored in the array Z. In one embodiment, an average value of an element D[i] in the array D equals (D[i−n]+ . . . +D[i−1]+D[i]+D[i+1]+ . . . +D[i+n])/(2n+1), where n is a preset integer, and an average value of an element Z[i] in the array Z equals (Z[i−n]+ . . . +Z[i−1]+Z[i]+Z[i+1]+ . . . +Z[i+n])/(2n+1). In one embodiment, a value of a first element and a value of a last element in the array D are not averaged, and a value of a first element and a value of a last element in the array Z are not averaged.

A detailed description of averaging the definitions of the captured images refer to FIG. 4a and FIG. 4b. FIG. 4a shows the array D storing the definition of each captured image before the data processing module 213 averages the definition of the captured images: D[0]=10, D[1]=12, D[2]=14, D[3]=13, D[4]=12, D[5]=14, D[6]=13, D[7]=15, and D[8]=4. FIG. 4b shows the array D storing the definition of each captured image after the data processing module 213 averages the definition of the captured images stored in the array D, supposing n=1, thus, an average value of an element D[i] in the array D equals (D[i−1]+D[i]+D[i+1])/3, and D[1]=(D[0]+D[1]+D[2])/3=12, D[2]=(D[1]+D[2]+D[3])/3=13, D[3]=(D[2]+D[3]+D[4])/3=13, accordingly, D[4]=13, D[5]=13, D[6]=14, D[7]=14. Because D[0] is the first element, D[8] is the last element of the array D, thus, D[0]=10, D[8]=14, which are not averaged. A method of averaging the Z-axis coordinates of the CCD lens 32 is similar to the method of averaging the definitions of the captured images.

The data processing module 213 further creates a Z-D coordinate system based on the average definitions and Z-axis coordinates, samples new Z-axis coordinates at a preset interval in the Z-D coordinates system, and calculates a new definition of each captured image based on the new Z-axis coordinates. In one embodiment, a D-axis stands for the definition of each captured image, and a Z-axis stands for the Z-axis coordinates of the CCD lens 32 used to capture the images.

Figure 5:
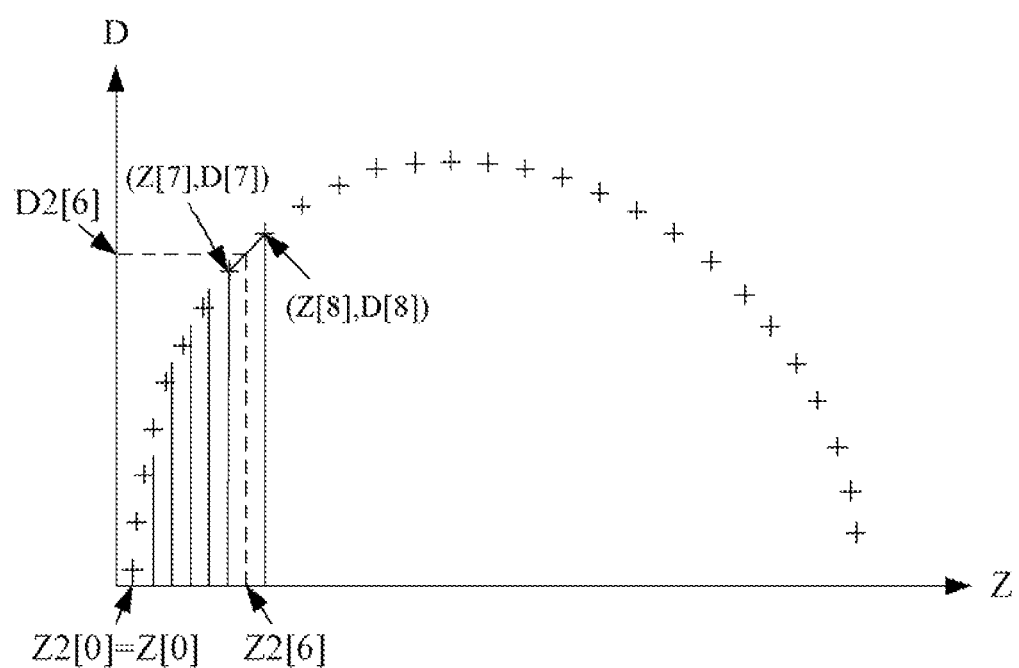
FIG. 5 is a schematic graph of one embodiment of sampling new Z-axis coordinates in a Z-D coordinate system.

FIG. 5 is a schematic graph of one embodiment of sampling the new Z-axis coordinates in the Z-D coordinate system. Supposing the sampled new Z-axis coordinates are stored in an array Z2, where Z2[0]=Z[0]. An example of calculating a value of a new definition D2[6] of a captured image based on a new Z-axis coordinates Z2[6] is as follows. Firstly, the data processing module 213 finds an element Z[i], where Z[i]≦Z2[6] and Z[i+1]≧Z2[6]. As shown in FIG. 5, Z[i]=Z[7] because Z[7]≦Z2[6] and Z[8]≧Z2[6]. Secondly, the data processing module 213 connects a point (Z[7], D[7]) and (Z[8], D[8]) to obtain a straight line, calculates an intersection point between the connected straight line and a straight line z=Z2[6], where a D-axis coordinate of the intersection point in the Z-D coordinate system is the value of the new definition D2[6].

The second positioning module 212 further calculates an accurate Z-axis coordinate of the CCD lens 32 based on the selected surface, the new Z-axis coordinates and the new definition of each captured image, and moves the CCD lens 32 to a position corresponding to the accurate Z-axis coordinate. A detailed description of calculating the accurate Z-axis coordinate of the CCD lens 32 refer to FIG. 7.

Figure 6:
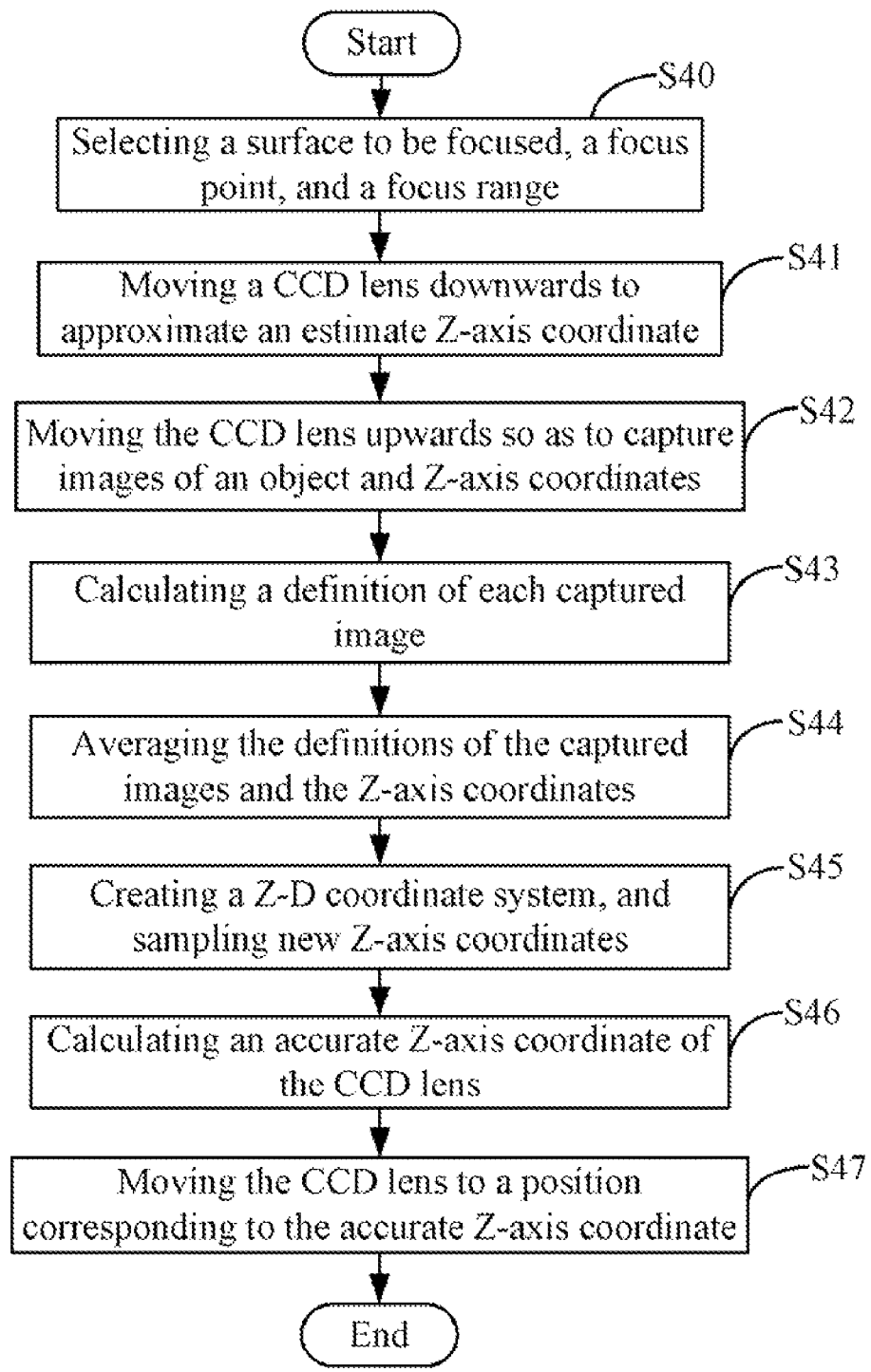
FIG. 6 is a flowchart of one embodiment of a method for focusing a CCD lens on a selected surface of an object to be measured.

FIG. 6 is a flowchart of one embodiment of a method for focusing a CCD lens 32 on a selected surface of an object 35 to be measured.

In block S40, the selecting module 210 receives a selected surface of the object 35 for the CCD lens 32 to focus on to take an image, and receives a focus point, and a focus range (L×W) of the selected surface that is designated by a user in the image. In one embodiment, a center of the focus range is the focus point, and a size of the focus range is determined according to the focus point, a length of the focus range ("L"), and a width of the focus range ("W"). An example of a focus point and a focus range refer to FIG. 3.

In block S41, The first positioning module 211 aligns a center of the CCD lens 32 at a position of the focus point, and moves the CCD lens 32 downwards by a first preset distance from a current Z-axis coordinate to approximate an estimate Z-axis coordinate of the CCD lens 32. A detailed description refer to paragraphs [0021] and [0022].

In block S42, the second positioning module 212 moves the CCD lens 32 upwards by a second preset distance from the estimate Z-axis coordinate, captures a sequence of images of the object 35 while the CCD lens 32 moves upwards, and records Z-axis coordinates of the CCD lens 32 while capturing each of the sequence of images. In one embodiment, the second preset distance is less than the first preset distance.

In block S43, the second positioning module 212 calculates a definition of each captured image based on the focus point and the focus range. In one embodiment, the definition of each captured image is stored in an array D, and the Z-axis coordinates of the CCD lens 32 are stored in an array Z, and an array index of a definition of a captured image in the array D is the same as an array index of a Z-axis coordinate of the CCD lens 32 in the array Z when the image is captured. A detailed description of calculating the definition of the captured image refer to paragraph [0023].

In block S44, the data processing module 213 averages the definitions of the captured images stored in the array D and the Z-axis coordinates of the CCD lens 32 stored in the array Z. In one embodiment, an average value of an element D[i] in the array D equals (D[i−n]+ . . . +D[i−1]+D[i]+D[i+1]+ . . . +D[i+n])/(2n+1), where n is a preset integer, and an average value of an element Z[i] in the array Z equals (Z[i−n]+ . . . +Z[i−1]+Z[i]+Z[i+1]+ . . . +Z[i+n])/(2n+1). In one embodiment, a value of a first element and a value of a last element in the array D are not averaged, and a value of a first element and a value of a last element in the array Z are not averaged. A detailed description of averaging the definitions of the captured images and the Z-axis coordinates of the CCD lens 32 refer to paragraph [0027].

In block S45, the data processing module 213 creates a Z-D coordinate system based on the average definitions and Z-axis coordinates, samples new Z-axis coordinates at a preset interval in the Z-D coordinates system, and calculates a new definition of each captured image based on the new Z-axis coordinates. In one embodiment, a D-axis stands for the definition of each captured image, and a Z-axis stands for the Z-axis coordinates of the CCD lens 32 used to capture the images. A detailed description of sampling the new Z-axis coordinates in the Z-D coordinate system refer to paragraph [0029].

In block S46, the second positioning module 212 calculates an accurate Z-axis coordinate of the CCD lens 32 based on the selected surface, the new Z-axis coordinates and the new definition of each captured image. A detailed description of calculating the accurate Z-axis coordinate of the CCD lens 32 refer to FIG. 7.

In block S47, the second positioning module 212 moves the CCD lens 32 to a position corresponding to the accurate Z-axis coordinate.

Figure 7:
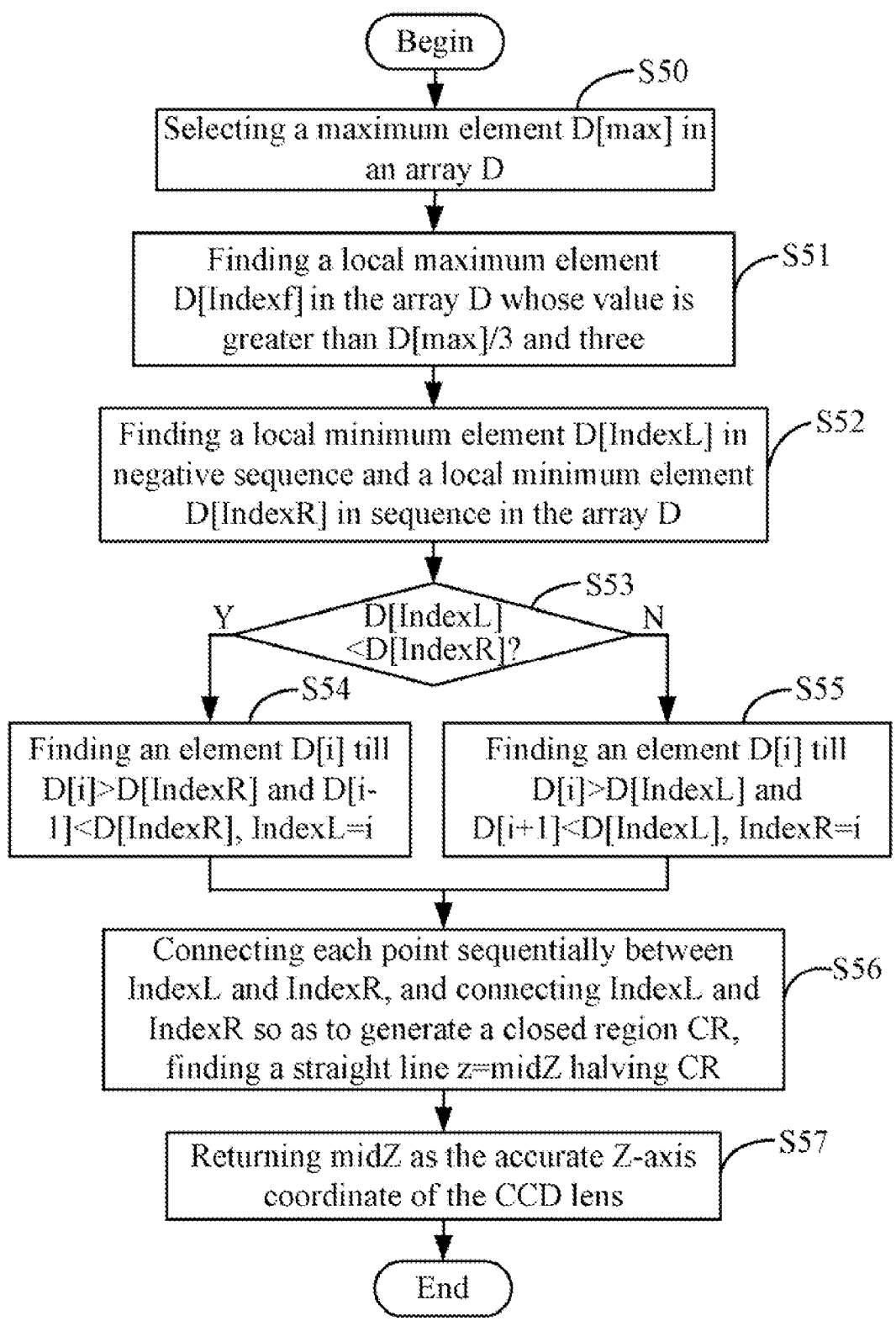
FIG. 7 is a flowchart of one embodiment of calculating an accurate Z-axis coordinate of the CCD lens.

FIG. 7 is a flowchart of one embodiment of calculating the accurate Z-axis coordinate of the CCD lens 32 in block S46.

In block S50, the second positioning module 212 selects a maximum element D[max] in the array D, where D[max]>3. If D[max]≦3, the second positioning module 212 outputs a failure information on the display device 1. In one embodiment, the failure information includes that the definition of the captured images are not qualified.

In block S51, the second positioning module 212 finds a local maximum element D[Indexf] in the array D based on the selected surface, where D[Indexf]>D[max]/3, and D[Indexf]> 3. A detailed description is as follows. If the selected surface is an upper surface, the module 212 finds a local maximum element D[Indexf] in the array D in negative sequence, where D[Indexf]>D[max]/3 and D[Indexf]>3. If the selected surface is a lower surface, the module 212 finds a local maximum element D[Indexf] in the array D in sequence, where D[Indexf]>D[max]/3 and D[Indexf]>3. In one embodiment, an element D[i] is regarded as a local maximum element if the followed conditions are satisfied: D[i]>D[i−1], D[i−2], . . . , D[i−m], and D[i]>D[i+1], D[i+2], . . . , D[i+m], where "m" is a preset integer, such as m=2.

In block S52, the second positioning module 212 finds a local minimum element D[IndexL] in negative sequence from the element D[Indexf] of the array D, and further finds a local minimum element D[IndexR] in sequence from the element D[Indexf] of the array D. In one embodiment, an element D[i] is regarded as a local minimum element if the followed conditions are satisfied: D[i]<D[i−1], D[i−2], . . . , D[i−m], and D[i]<D[i+1], D[i+2], . . . , D[i+m], where "m" is a preset integer, such as m=2.

In block S53, the second positioning module 212 determines if D[IndexL]<D[IndexR], the procedure goes to block S54 if D[IndexL]<D[IndexR]. Otherwise, the procedure goes to block S55 if D[IndexL]≧D[IndexR].

In block S54, the second positioning module 212 finds an element D[i] in negative sequence from the element D[Indexf] of the array D till D[i]>D[IndexR] and D[i−1]<D[IndexR], IndexL=i, then, the procedure goes to block S56.

In block S55, the second positioning module 212 finds an element D[i] in sequence from the element D[Indexf] of the array D till D[i]>D[IndexL] and D[i+1]<D[IndexL], IndexR=i, then, the procedure goes to block S56.

Figure 8:
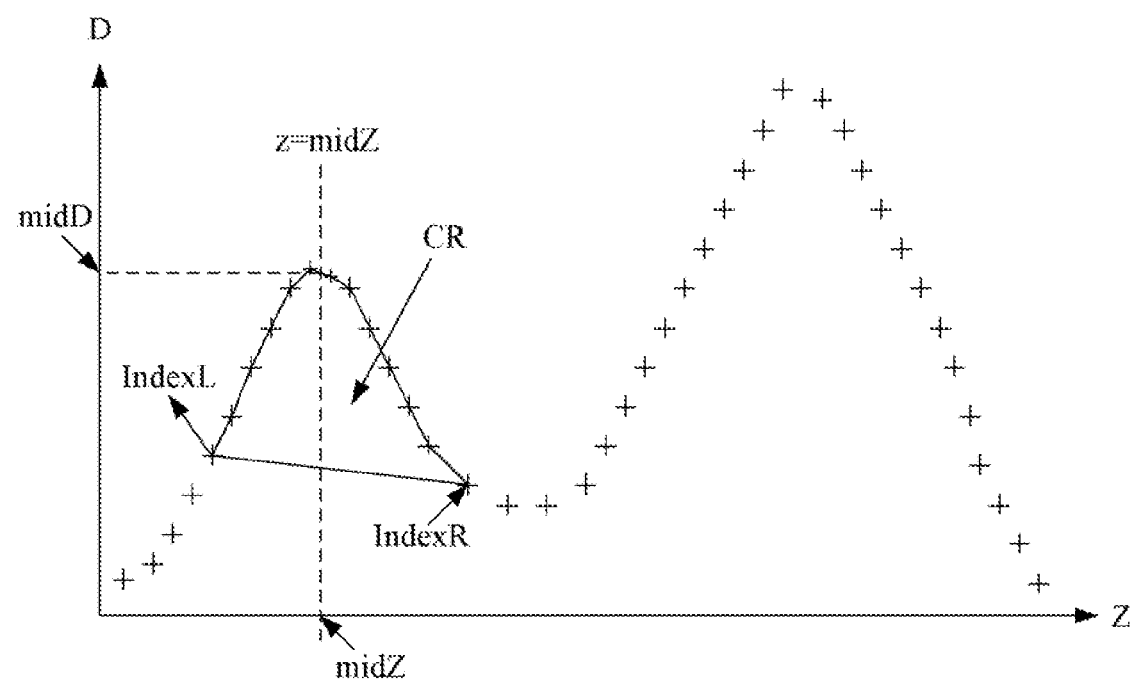
FIG. 8 is a schematic graph of one embodiment of a closed region CR.
Figure 9:
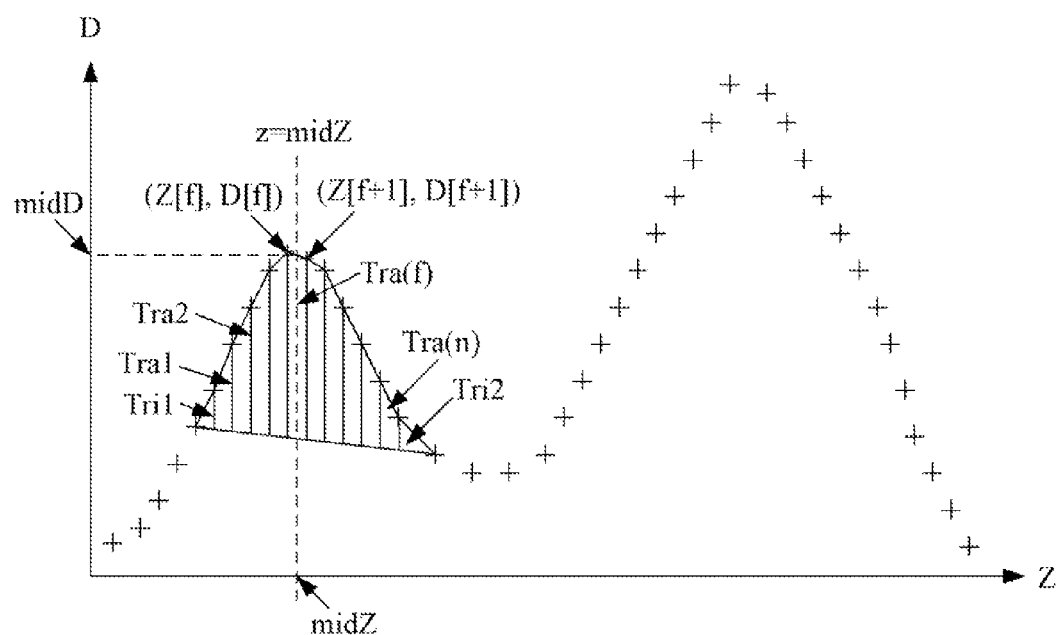
FIG. 9 is a schematic graph of one embodiment of calculating a straight line halving the closed region CR in the Z-D coordinate system.

In block S56, the second positioning module 212 connects each point sequentially between IndexL and IndexR in the Z-D coordinate system, and further connects IndexL and IndexR so as to generate a closed region CR (refer to FIG. 8), then finds a straight line z=midZ halving the closed region CR (refer to FIG. 9).

In block S57, the second positioning module 212 returns midZ as the accurate Z-axis coordinate of the CCD lens 32 to focus on the selected surface.

FIG. 9 is a schematic graph of one embodiment of calculating the straight line z=midZ halving the closed region CR in the Z-D coordinate system. As shown in FIG. 9, the closed region CR includes triangles of Tri1 and Tri2, and Trapezoids of Tra1, Tra2, . . . , and Tra(n). Supposing Area-A represents a total area of the closed region CR, thus, Area-A=Tri1+Tra1+Tra2+ . . . +Tra(n)+Tri2. Secondly, supposing Area-L(i)=Tri1+Tra1+Tra2+ . . . +Tra(i), the module 212 finds Area-L(i) from i=1 till Area-L(i)≦Area-A/2 and Area-L(i+1)>Area-A/2, f=i, 1=i−1, r=i+1, where i≦n.

Supposing Area-L(1) represents an area on the left side of the trapezoid Tra(f) in the closed region CR, and Area-L(r) represents an area on the right side of the trapezoid Tra(f) in the closed region CR. Thus:

$$\text{Area-}L(1)=\text{Tri}1+\text{Tra}1+\text{Tra}2+\ldots\text{Tra}(1) \tag{1}$$

$$\text{Area-}R(r)=\text{Tri}2+\text{Tra}(r)+\text{Tra}(r+1)+\ldots+\text{Tra}(n) \tag{2}$$

$$\text{Area-}L(1)+\text{Area-}R(r)+\text{Tra}(f)=\text{Area-}A \tag{3}$$

$$\text{Area-}L(1)<\text{Area-}R(r)+\text{Tra}(f),\text{ and }\text{Area-}R(r)<\text{Area-}L(1)+\text{Tra}(f) \tag{4}$$

The straight line z=midZ divides the trapezoid Tra(f) into a left part and a right part, the left part is marked as AL, and the right part is marked as AR. Then, the module 212 calculates coefficients of "k" and "b" in a straight line y=k*x+b based on a point (Z[f], D[f]) and a point (Z[f+1], D[f+1]) in the Z-D coordinate system. Thus:

$$\text{mid}D=k*\text{mid}Z+b \tag{5}$$

$$AL=(\text{mid}D+D[f])*(\text{mid}Z-Z[f])/2 \tag{6}$$

$$AR=(\text{mid}D+D[f+1])*(Z[f+1]-\text{mid}Z)/2 \tag{7}$$

$$\text{Area-}L(1)+AL=\text{Area-}R(r)+AR \tag{8}$$

Thirdly, the module 212 substitutes midD in the formula (6) and (7) with a value of midD in the formula (5), then substitutes AL and AR in the formula (8) with the substituted formula (6) and (7) so as to obtain a followed formula (9).

$$\text{Area-}L(1)+(k*\text{mid}Z+b+D[f])*(\text{mid}Z-Z[f])/2=\text{Area-}R(r)+(k*\text{mid}Z+b+D[f+1])*(Z[f+1]-\text{mid}Z)/2 \tag{9}$$

In the formula (9), there is only one unknown numerical value "midZ", thus a value of midZ is obtained by calculating the formula (9).

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A computer-implemented method for focusing a charge coupled device (CCD) lens on a selected surface of an object to be measured, the method comprising:

obtaining an image of the object captured by the CCD lens of an image measuring machine;

selecting a surface to be focused in the image of the object, and selecting a focus point and a focus range of the selected surface in the image;

aligning a center of the CCD lens at a position of the focus point, and moving the CCD lens downwards by a first preset distance from a current Z-axis coordinate to approximate an estimate Z-axis coordinate of the CCD lens;

moving the CCD lens upwards by a second preset distance from the estimate Z-axis coordinate, capturing a sequence of images of the object while the CCD lens moves upwards, and recording Z-axis coordinates of the CCD lens while capturing each of the sequence of images;

calculating a definition of each captured image based on the focus point and the focus range;

averaging the definitions of the captured images and the Z-axis coordinates of the CCD lens;

creating a Z-D coordinate system based on the average definitions and Z-axis coordinates, sampling new Z-axis coordinates at a preset interval in the Z-D coordinate system, and calculating a new definition of each captured image based on the new Z-axis coordinates;

calculating an accurate Z-axis coordinate of the CCD lens based on the selected surface, the new Z-axis coordinates and the new definition of each captured image; and moving the CCD lens to a position corresponding to the accurate Z-axis coordinate.

2. The method according to claim 1, wherein the selected surface is an upper surface or a lower surface of the image of the object.

3. The method according to claim 1, wherein aligning a center of the CCD lens at a position of the focus point comprises:

aligning an X-axis coordinate of the center of the CCD lens at an X-axis coordinate of the focus point; and aligning a Y-axis coordinate of the center of the CCD lens at a Y-axis coordinate of the focus point.

4. The method according to claim 1, wherein the second preset distance is less than the first preset distance.

5. The method according to claim 1, wherein moving the CCD lens downwards by a first preset distance from a current Z-axis coordinate to approximate an estimate Z-axis coordinate of the CCD lens comprises:

capturing a sequence of images of the object while the CCD lens moves downwards;

recording Z-axis coordinates of the CCD lens while capturing each of the sequence of images;

calculating a definition of the focus range of the selected surface in each captured image to obtain a definition of each captured image, wherein a center of the focus range is regarded as the focus point;

selecting a captured image having a highest definition, identifying a Z-axis coordinate of the CCD lens that captured the highest definition, and regarding the obtained Z-axis coordinate of the CCD lens as the estimate Z-axis coordinate of the CCD lens.

6. The method according to claim 1, wherein a definition of each capturing image is stored in an array D, and the Z-axis coordinates of the CCD lens are stored in an array Z, wherein an array index of a definition of a captured image in the array D is the same as an array index of a Z-axis coordinate of the CCD lens in the array Z when the image is captured.

7. The method according to claim 6, wherein averaging the definitions of the captured images and the Z-axis coordinates of the CCD lens comprises:

an average value of an element D[i] in the array D equals (D[i−n]+ . . . +D[i−1]+D[i]+D[i+1]+ . . . +D[i+n])/(2n+1), wherein n is a preset integer; and an average value of an element Z[i] in the array Z equals (Z[i−n]+ . . . +Z[i−1]+Z[i]+Z[i+1]+ . . . +Z[i+n])/(2n+1); wherein a value of a first element and a value of a last element in the array D are not averaged, and a value of a first element and a value of a last element in the array Z are not averaged.

8. The method according to claim 6, wherein the Z-D coordinate system comprises a Z-axis and a D-axis, wherein the D-axis stands for the definition of each captured image, and the Z-axis stands for the Z-axis coordinates of the CCD lens used to capture the images.

9. The method according to claim 6, wherein calculating an accurate Z-axis coordinate of the CCD lens comprises:

selecting a maximum element D[max] in the array D, wherein D[max]>3;

finding a local maximum element D[Indexf] in the array D based on the selected surface, wherein D[Indexf]>D[max]/3, and D[Indexf]>3;

finding a local minimum element D[IndexL] in negative sequence from the element D[Indexf] of the array D, and further finding a local minimum element D[IndexR] in sequence from the element D[Indexf] of the array D;

if D[IndexL]<D[IndexR], finding an element D[i] in negative sequence from the element D[Indexf] of the array D till D[i]>D[IndexR] and D[i−1]<D[IndexR], IndexL=i;

if D[IndexL]≧D[IndexR], finding an element D[i] in sequence from the element D[Indexf] of the array D till D[i]>D[IndexL] and D[i+1]<D[IndexL], IndexR=i;

connecting each point sequentially between IndexL and IndexR in the Z-D coordinate system, and further connecting IndexL and IndexR so as to generate a closed region CR, then finding a straight line z=midZ halving the closed region CR; and returning midZ as the accurate Z-axis coordinate of the CCD lens to focus on the selected surface.

10. The method according to claim 9, wherein finding a local maximum element D[Indexf] in the array D based on the selected surface comprises:

if the selected surface is an upper surface, finding a local maximum element D[Indexf] in the array D in negative sequence, wherein D[Indexf]>D[max]/3, and D[Indexf]> 3; and if the selected surface is a lower surface, finding a local maximum element D[Indexf] in the array D in sequence, wherein D[Indexf]>D[max]/3, and D[Indexf]>3.

11. A computing system for focusing a charge coupled device (CCD) lens on a selected surface of an object to be measured, comprising:

a selecting module operable to receive a selected surface to be focused in an image of the object, and receive a focus point, and a focus range of the selected surface in the image, wherein the image of the object is captured by the CCD lens of an image measuring machine;

a first positioning module operable to align a center of the CCD lens at a position of the focus point, and move the CCD lens downwards by a first preset distance from a current Z-axis coordinate to approximate an estimate Z-axis coordinate of the CCD lens;

a second positioning module operable to move the CCD lens upwards by a second preset distance from the estimate Z-axis coordinate, capture a sequence of images of the object while the CCD lens moves upwards, and record Z-axis coordinates of the CCD lens while capturing each of the sequence of images;

the second positioning module further operable to calculate a definition of each captured image based on the focus point and the focus range;

a data processing module operable to average the definitions of the captured images and the Z-axis coordinates of the CCD lens;

the data processing module further operable to create a Z-D coordinate system based on the average definitions and Z-axis coordinates, sample new Z-axis coordinates at a preset interval in the Z-D coordinates system, and calculate a new definition of each captured image based on the new Z-axis coordinates;

the second positioning module further operable to calculate an accurate Z-axis coordinate of the CCD lens based on the selected surface, the new Z-axis coordinates and the new definition of each captured image; and the second positioning module further operable to move the CCD lens to a position corresponding to the accurate Z-axis coordinate.

12. The system according to claim 11, wherein the selected surface by the selecting module is an upper surface or a lower surface of the image of the object.

13. The system according to claim 11, wherein the first positioning module aligns a center of the CCD lens at a position of the focus point comprises:

aligning an X-axis coordinate of the center of the CCD lens at an X-axis coordinate of the focus point; and aligning a Y-axis coordinate of the center of the CCD lens at a Y-axis coordinate of the focus point.

14. The system according to claim 11, wherein the second preset distance is less than the first preset distance.

15. The system according to claim 11, wherein the first positioning module moves the CCD lens downwards by a first preset distance from a current Z-axis coordinate to approximate an estimate Z-axis coordinate of the CCD lens comprises:

capturing a sequence of images of the object while the CCD lens moves downwards; recording Z-axis coordinates of the CCD lens while capturing each of the sequence of images;

calculating a definition of the focus range of the selected surface in each captured image to obtain a definition of each captured image, wherein a center of the focus range is regarded as the focus point;

selecting a captured image having a highest definition, identifying a Z-axis coordinate of the CCD lens that captured the highest definition, and regarding the obtained Z-axis coordinate of the CCD lens as the estimate Z-axis coordinate of the CCD lens.

16. The system according to claim 11, wherein a definition of each capturing image is stored in an array D, and the Z-axis coordinates of the CCD lens are stored in an array Z, wherein an array index of a definition of a captured image in the array D is the same as an array index of a Z-axis coordinate of the CCD lens in the array Z when the image is captured.

17. The system according to claim 16, wherein the data processing module averages the definitions of the captured images and the Z-axis coordinates of the CCD lens comprises:

an average value of an element D[i] in the array D equals (D[i−n]+ . . . +D[i−1]+D[i]+D[i+1]+ . . . +D[i+n])/(2n+1), wherein n is a preset integer; and an average value of an element Z[i] in the array Z equals (Z[i−n]+ . . . +Z[i−1]+Z[i]+Z[i+1]+ . . . +Z[i+n])/(2n+1); wherein a value of a first element and a value of a last element in the array D are not averaged, and a value of a first element and a value of a last element in the array Z are not averaged.

18. The system according to claim 16, wherein the Z-D coordinate system comprises a Z-axis and a D-axis, wherein the D-axis stands for the definition of each captured image, and the Z-axis stands for the Z-axis coordinates of the CCD lens used to capture the images.

19. The system according to claim 16, wherein the second positioning module calculates an accurate Z-axis coordinate of the CCD lens comprises:

selecting a maximum element D[max] in the array D, wherein D[max]>3;

finding a local maximum element D[Indexf] in the array D based on the selected surface, wherein D[Indexf]>D[max]/3, and D[Indexf]>3;

finding a local minimum element D[IndexL] in negative sequence from the element D[Indexf] of the array D, and further finding a local minimum element D[IndexR] in sequence from the element D[Indexf] of the array D;

if D[IndexL]<D[IndexR], finding an element D[i] in negative sequence from the element D[Indexf] of the array D till D[i]>D[IndexR] and D[i−1]<D[IndexR], IndexL=i;

if D[IndexL]≧D[IndexR], finding an element D[i] in sequence from the element D[Indexf] of the array D till D[i]>D[IndexL] and D[i+1]<D[IndexL], IndexR=i;

connecting each point sequentially between IndexL and IndexR in the Z-D coordinate system, and further connecting IndexL and IndexR so as to generate a closed region CR, then finding a straight line z=midZ halving the closed region CR; and returning midZ as the accurate Z-axis coordinate of the CCD lens to focus on the selected surface.

20. The system according to claim 19, wherein finding a local maximum element D[Indexf] in the array D based on the selected surface comprises:

if the selected surface is an upper surface, finding a local maximum element D[Indexf] in the array D in negative sequence, wherein D[Indexf]>D[max]/3, and D[Indexf]> 3; and if the selected surface is a lower surface, finding a local maximum element D[Indexf] in the array D in sequence, wherein D[Indexf]>D[max]/3, and D[Indexf]>3.

* * * * *